United States Patent
Hwang

(10) Patent No.: US 6,496,779 B1
(45) Date of Patent: Dec. 17, 2002

(54) INERTIAL MEASUREMENT UNIT WITH MAGNETOMETER FOR DETECTING STATIONARITY

(75) Inventor: Patrick Y. Hwang, Marion, IA (US)

(73) Assignee: Rockwell Collins, Cedar Rapids, IA (US)

( * ) Notice: Subject to any disclaimer, the term of this patent is extended or adjusted under 35 U.S.C. 154(b) by 0 days.

(21) Appl. No.: 09/539,329

(22) Filed: Mar. 30, 2000

(51) Int. Cl.[7] ............................................. G01P 15/08
(52) U.S. Cl. ...................... 701/220; 244/165; 244/3.1; 244/3.2; 73/488; 73/510
(58) Field of Search .......................... 701/220; 244/165, 244/3.1, 3.2, 79, 80; 73/510, 514, 488; 33/321, 323

(56) References Cited

U.S. PATENT DOCUMENTS

| | | | |
|---|---|---|---|
| 4,013,945 A | 3/1977 | Grosso | 324/207.25 |
| 4,212,443 A * | 7/1980 | Duncan et al. | 244/177 |
| 4,275,605 A | 6/1981 | Kennel | 74/5.34 |
| 4,303,978 A | 12/1981 | Shaw et al. | 701/220 |
| 5,332,180 A * | 7/1994 | Peterson et al. | 246/3 |
| 5,383,363 A * | 1/1995 | Kulmaczewski | 73/510 |
| 5,386,953 A * | 2/1995 | Stuart | 244/158 R |
| 5,754,023 A * | 5/1998 | Roston et al. | 318/561 |
| 5,841,537 A | 11/1998 | Doty | 356/484 |
| 5,847,673 A * | 12/1998 | DeBell | 342/25 |

* cited by examiner

Primary Examiner—William A. Cuchlinski, Jr.
Assistant Examiner—Marthe Marc-Coleman
(74) Attorney, Agent, or Firm—Nathan O. Jensen; Kyle Eppele

(57) ABSTRACT

A device for measuring a velocity and/or position of a body includes a magnetometer and a measurement unit. The magnetometer is configured to sense a magnetic flux to which the body is exposed. The measurement unit includes a sensor sensing one of an acceleration and a velocity of the body. The measurement unit also includes a processor coupled to the magnetometer and to the measurement unit and configured to determine one on a velocity value and a position value for the body based on the sensed magnetic flux and based or one of the sensed acceleration and the sensed velocity of the body.

3 Claims, 1 Drawing Sheet

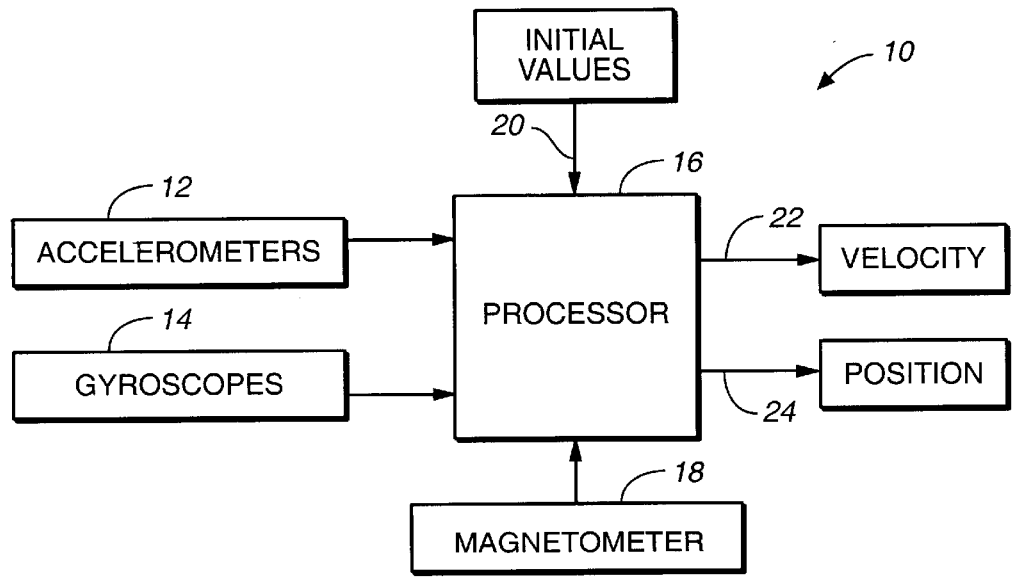
FIG._1
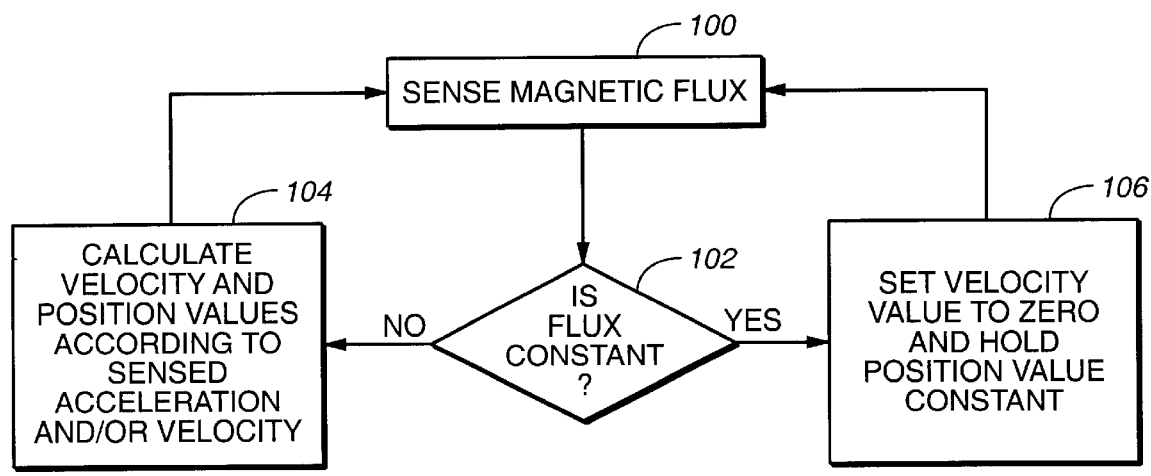
FIG._2

INERTIAL MEASUREMENT UNIT WITH MAGNETOMETER FOR DETECTING STATIONARITY

FIELD OF THE INVENTION

The present invention relates generally to inertial measurement units. More particularly, the present invention relates to detecting stationarity of an inertial measurement unit.

BACKGROUND OF THE INVENTION

An inertial measurement unit (IMU) is a self-contained system which can automatically determine the position, velocity and attitude of a moving vehicle or other body. Based on prior knowledge of initial position, initial velocity, and initial orientation relative to a known reference frame, an IMU is capable of determining its present position, velocity and orientation without the aid of external information. Typical IMUs operate by sensing the linear acceleration and deceleration of the body in three-dimensional space with accelerometers and by sensing the rotational velocity, or rotational rate, with gyroscopes. Based on the sensed linear acceleration, the IMU calculates changes in linear velocity and, in turn, changes in position. Based on the sensed rotational velocity, the IMU calculates changes in rotational orientation, or attitude. The navigational data generated by IMUs are commonly used to determine the future course for a body to follow in order to bring it to its intended destination. IMUs are commonly used in the guidance and control of aircraft, missiles, spacecraft, ships and submarines, as well as for personal navigation.

IMU-based navigational systems are not as accurate as some other navigational systems such as GPS (Global Positioning Satellite) systems. The IMU inevitably senses noise in the acceleration and velocity data. This causes the accuracy of the IMU to degrade over time until the actual velocity and position of the body is updated. Often IMUs are used to supplement more accurate systems such as GPS or are used as backup to such systems. Also, there are locations where GPS signals are not available. Thus, there exists a need for a more accurate IMU.

The present invention provides a solution to this and other problems and offers other advantages over the prior art.

SUMMARY OF THE INVENTION

The present invention relates to detecting stationarity of an inertial measurement unit.

One embodiment of the present invention is directed to a device for measuring the velocity and/or position of a body. The device includes a measurement unit and a magnetometer. The measurement unit is capable of sensing an acceleration and/or a velocity of the body. The measurement unit is further capable of determining a velocity value and/or a position value based on the sensed acceleration and/or the sensed velocity of the body. The magnetometer is capable of sensing the magnetic flux to which the body is exposed, thereby determining whether the body is at rest.

In one embodiment of such a device, if the sensed magnetic flux is substantially constant, the velocity value is set at zero and the position value is held at its present value.

Another embodiment of the present invention is directed to a method of reducing degradation of the accuracy of an inertial measurement unit. The magnetic flux to which the inertial measurement unit is exposed is sensed. Stationarity conditions are invoked if the sensed magnetic flux is substantially constant.

In one embodiment of such a method, invoking stationarity conditions involves setting the velocity value at zero and/or holding the position value constant at its present value.

These and various other features as well as advantages which characterize the present invention will be apparent upon reading of the following detailed description and review of the associated drawings.

BRIEF DESCRIPTION OF THE DRAWINGS

FIG. 1 is a block diagram of an inertial measurement unit according to an illustrative embodiment of the present invention.

FIG. 2 is a flowchart illustrating a method of reducing degradation of the accuracy of an IMU according to an illustrative embodiment of the present invention.

DETAILED DESCRIPTION OF ILLUSTRATIVE EMBODIMENTS

FIG. 1 is a block diagram of an inertial measurement unit (IMU) 10 according to an illustrative embodiment of the present invention. IMU 10 measures the position, velocity and attitude of a vehicle or other body. IMU 10 includes one or more accelerometers 12, one or more gyroscopes 14, processor 16 and magnetometer 18.

In an illustrative embodiment, processor 16 is a digital microprocessor. In this embodiment, IMU 10 also includes, where necessary, circuitry or devices for converting information provided by accelerometers 12, gyroscopes 14 and magnetometers 18 into a digital format usable by processor 16. This circuitry or devices (not shown) can be incorporated within accelerometers 12, gyroscopes 14, magnetometer 18, or processor 16, or can be separately embodied.

The accelerometers 12 sense the linear acceleration and deceleration in three-dimensional space and provide an output indicative of the sensed acceleration to processor 16. Processor 16 also has an input 20 through which it can receive information regarding initial position, velocity, and attitude relative to a known reference frame. Based on the initial information and the acceleration sensed by accelerometers 12, processor 16 calculates the linear velocity and, in turn, the spatial position of the body. The calculated velocity value 22 and position value 24 are provided as outputs from processor 16. It should be noted that velocity output 22 may include both linear and rotational velocities and position output 24 may include both spatial position and rotational attitude. However, for simplicity's sake, FIG. 1 shows only generic velocity 22 and position 24 outputs. In an illustrative embodiment, the linear velocity and spatial position are repeatedly updated at a predetermined rate. Inevitably noise exists in the linear acceleration data provided to processor 16 by accelerometers 12. This is true even when the IMU 10 is stationary. This noise causes the accuracy of the IMU 10 to degrade over time until the actual linear velocity and spatial position of the body are updated via input 20. Therefore, the errors in the velocity and position values increase over time.

To help reduce the degradation of the accuracy of the calculated velocity and position values, the present invention provides magnetometer 18 to discern when the IMU 10 is stationary. Magnetometer 18 senses magnetic flux in three-dimensional space. In an illustrative embodiment, the sensed flux is represented by a vector having orthogonal x, y and z components. Thus the magnetometer senses both the magnitude and direction of the magnetic flux. The magnetic fields that are produced by the earth are complex and typically nonlinear spatially, but do not vary over time (unless near time-varying electromagnetic sources). Therefore, the magnetic flux vector will change somewhat erratically when the magnetometer 18 is in motion, but the vector ceases to vary when the magnetometer 18 is stationary. This provides a very reliable indication of when the magnetometer 18 is at rest.

Magnetometer 18 provides a signal to processor 16 indicative of the sensed magnetic flux. When the sensed magnetic flux holds steady at a substantially constant value, indicating that the IMU 10 is stationary, processor 16 invokes predetermined stationarity conditions. In an illustrative embodiment, these stationarity conditions include setting the linear velocity value to zero. Correspondingly, in an illustrative embodiment, the spatial position value is maintained at its present value, i.e., its value at the time the magnetic flux becomes constant. Thus the growth of the error in the linear velocity and spatial position values is retarded while the IMU 10 is stationary. As mentioned above, without this invoking of the stationarity conditions, the error in the velocity and position values would continue to grow while the IMU 10 is stationary.

IMU 10 also illustratively includes one or more gyroscopes 14 that sense rotational, or angular, velocity of the body and provide an output to processor 16 indicative of the sensed rotational velocity. Based on initial rotational information provided at input 20 and the rotational velocity sensed by gyroscopes 14, processor 16 calculates the attitude of the body. As with the linear acceleration sensed by accelerometers 12, noise inevitably exists in the rotational velocity data provided to processor 16 by gyroscopes 14, causing the accuracy of the IMU 10 to degrade over time.

As mentioned above, magnetometer 18 illustratively senses the direction as well as the magnitude of the magnetic flux to which it is exposed. The direction of the magnetic flux sensed by magnetometer 18 will vary when the magnetometer is rotating, but will cease to vary when the magnetometer is both spatially and rotationally stationary. Thus, according to an illustrative embodiment of the present invention, when the sensed magnetic flux holds at a constant value, indicating that the IMU 10 is stationary, processor 16 invokes predetermined stationarity conditions in the rotational domain as well as in the spatial domain. In an illustrative embodiment, these stationarity conditions include setting the rotational velocity value to zero. Correspondingly, the attitude value is maintained at its present value. Thus the growth of the error in the rotational velocity and attitude values is retarded while the IMU 10 is stationary.

FIG. 2 is a flowchart illustrating a method of reducing degradation of the accuracy of an IMU according to an illustrative embodiment of the present invention. At block 100, the magnetic flux to which the IMU 10 is exposed is sensed by the magnetometer. At block 102, it is queried whether the sensed magnetic flux is holding substantially constant as opposed to varying. If the magnetic flux is not remaining substantially constant, this indicates that the IMU is in motion (either linear or rotational). Therefore at block 104, the velocity and position values are calculated according to the sensed acceleration and/or velocity. According to an illustrative embodiment, this includes calculating the linear velocity and spatial position of the body according to the linear acceleration sensed by accelerometers 12, and calculating the rotational velocity and attitude according to the rotational velocity sensed by gyroscopes 14. If, on the other hand, the magnetic flux sensed by magnetometer 18 is remaining substantially constant, this indicates that the IMU is stationary (both spatially and rotationally). Therefore, at block 106, processor 16 invokes predetermined stationarity conditions. In an illustrative embodiment, this includes setting the velocity value to zero and holding the position value constant at its present value, as shown at block 106. In a further illustrative embodiment, setting the velocity value to zero includes setting both the linear velocity and the rotational velocity to zero. Likewise, holding the position value constant illustratively includes holding both the spatial position and the attitude at a constant value. In an illustrative embodiment, the above-described process is performed in a continuous loop, as shown in FIG. 2.

In summary, one embodiment of the present invention is directed to a device 10 for measuring the velocity and/or position of a body. The device 10 includes a measurement unit 12, 14, 16 and a magnetometer 18. The measurement unit 12, 14, 16 is capable of sensing an acceleration and/or a velocity of the body. The measurement unit 12, 14, 16 is further capable of determining a velocity value 22 and/or a position value 24 based on the sensed acceleration and/or the sensed velocity of the body. The magnetometer 18 is capable of sensing the magnetic flux to which the body is exposed, thereby determining whether the body is at rest.

In one embodiment of the present invention, if the sensed magnetic flux is substantially constant, the velocity value 22 is set at zero and the position value 24 is held at its present value.

Another embodiment of the present invention is directed to a method of reducing degradation of the accuracy of an inertial measurement unit 10. The magnetic flux to which the inertial measurement unit 10 is exposed is sensed. Stationarity conditions are invoked if the sensed magnetic flux is substantially constant.

In one embodiment, invoking stationarity conditions involves setting the velocity value 22 at zero and/or holding the position value 24 constant at its present value.

It is to be understood that even though numerous characteristics and advantages of various embodiments of the present invention have been set forth in the foregoing description, together with details of the structure and function of various embodiments of the invention, this disclosure is illustrative only, and changes may be made in details, especially in matters of structure and arrangement of parts within the principles of the present invention to the full extent indicated by the broad general meaning of the terms in which the appended claims are expressed. For example, although magnetometer 18 is shown and described herein is being an integral part of IMU 10, magnetometer can alternatively exist as a separate entity with appropriate connection to IMU 10, without departing from the scope and spirit of the present invention. Other modifications can also be made.

What is claimed is:

1. A device for measuring a velocity and/or position of a body, comprising:
   a magnetometer configured to sense a magnetic flux to which the body is exposed, wherein the magnetic flux being substantially constant is indicative of the body being at rest; and
   a measurement unit including
      a sensor sensing one of an acceleration and a velocity of the body, and
      a processor coupled to the magnetometer and to the sensor and configured to determine one of a velocity value and a position value for the body based on the sensed magnetic flux and based on the one of the sensed acceleration and the sensed velocity of the body;

wherein the sensor is configured to sense as the acceleration a linear acceleration of the body, wherein the processor is configured to one of calculate as the velocity value a linear velocity value based on the sensed linear acceleration, and wherein the processor is configured to set the linear velocity value at zero if the sensed magnetic flux is substantially constant, and calculate as the position value a spatial position value based on the sensed linear acceleration, and wherein the processor is configured to maintain the spatial position value at a present value if the sensed magnetic flux is substantially constant.

2. A device for measuring a velocity and/or position of a body, comprising:

a magnetometer configured to sense a magnetic flux to which the body is exposed, wherein the magnetic flux being substantially constant is indicative of the body being at rest; and a measurement unit including a sensor sensing one of an acceleration and a velocity of the body, and a processor coupled to the magnetometer and to the sensor and configured to determine one of a velocity value and a position value for he body based on the sensed magnetic flux and based on the one of the sensed acceleration and the sensed velocity of the body;

wherein the sensor is configured to sense as the velocity a rotational velocity of the body, wherein the processor is configured to one of determine as the velocity value a rotational velocity value based on the sensed rotational velocity, and wherein the processor is configured to set the rotational velocity value at zero if the sensed magnetic flux is substantially constant, and calculate as the position value a rotational attitude value based on the sensed rotational velocity, and wherein the processor is configured to maintain the rotational attitude value at a present value if the sensed magnetic flux is substantially constant.

3. A method of reducing degradation of an accuracy of an inertial measurement unit for measuring a velocity and position of a body, the method comprising:

sensing a magnetic flux to which the inertial measurement unit is exposed; and invoking stationarity conditions if the sensed magnetic flux is substantially constant, wherein the inertial measurement unit is configured to determine one of a velocity value for the body and a position value for the body, said velocity value comprising one of a linear velocity value and a rotational velocity value, said position value comprising one of a spatial position value and a rotational attitude value, and wherein invoking stationarity conditions comprises one of setting the velocity value at zero and maintaining the position value at a present value.

* * * * *